(12) United States Patent
Leung

(10) Patent No.: US 8,157,399 B2
(45) Date of Patent: Apr. 17, 2012

(54) CONTROL UNIT FOR AN APPLIANCE

(75) Inventor: Tony Leung, Hampton, VA (US)

(73) Assignee: General Electric Company, Schenectady, NY (US)

(*) Notice: Subject to any disclaimer, the term of this patent is extended or adjusted under 35 U.S.C. 154(b) by 783 days.

(21) Appl. No.: 12/244,894

(22) Filed: Oct. 3, 2008

(65) Prior Publication Data
US 2010/0085207 A1 Apr. 8, 2010

(51) Int. Cl.
*G09F 13/08* (2006.01)
(52) U.S. Cl. ....... 362/97.3; 362/97.2; 362/602; 362/630
(58) Field of Classification Search ............. 362/97.2, 362/97.3, 602, 603, 606, 612, 613, 614, 630
See application file for complete search history.

(56) References Cited

U.S. PATENT DOCUMENTS

| 6,750,433 | B2 | 6/2004 | Guenther, et al. |
| 2008/0204417 | A1* | 8/2008 | Pierce et al. ................ 345/168 |
| 2009/0054112 | A1* | 2/2009 | Cybart et al. ............. 455/575.3 |
| 2009/0201447 | A1* | 8/2009 | Zhuang et al. ................ 349/97 |

* cited by examiner

*Primary Examiner* — David V Bruce
(74) *Attorney, Agent, or Firm* — Global Patent Operation; Douglas D. Zhang

(57) ABSTRACT

A control unit including a keypad having a plurality control indicators, a light producing device configured to illuminate the control indicators, and a light blocking device disposed between the control indicators and the light producing device and configured to selectively restrict or transmit light from the light producing device to the control indicators.

17 Claims, 9 Drawing Sheets

US 8,157,399 B2

CONTROL UNIT FOR AN APPLIANCE

BACKGROUND OF THE INVENTION

The exemplary embodiments of the present invention generally relate to appliances. More particularly, the exemplary embodiments relate to control units for appliances and methods for illuminating keys of such control units.

Generally, heuristic or prompting keypads have been developed by placing, for example, light emitting diodes (LEDs) or incandescent bulbs behind each key in a keypad as can be seen in FIG. 7. This type of design generally requires a large power supply, as there is a light source for each individual key. The conventional keypad design is also not compact in size. For example, the LEDs or light bulbs must be spaced apart from a respective key by a diffusion distance to ensure the respective key is adequately and evenly lit.

BRIEF DESCRIPTION OF THE INVENTION

As described herein, the exemplary embodiments overcome one or more of the above or other disadvantages known in the art.

One aspect of the exemplary embodiments relates to a control unit. The control unit includes a keypad having a plurality of control indicators, a light producing device configured to illuminate the control indicators, and a light blocking device disposed between the control indicators and the light producing device and configured to selectively restrict or transmit light from the light producing device to the control indicators.

Another aspect of the exemplary embodiments relates to a control unit for an electric appliance. The control unit includes a keypad having control indicators forming keys of the keypad, a light guide disposed adjacent the keys and being configured to direct light from a light source to the keys for illuminating the keys and a liquid crystal display grid disposed between the keypad and light guide, the liquid crystal display grid being configured to selectively restrict light from being transmitted from the light guide to one or more keys.

Still another aspect of the exemplary embodiments relates to a method for illuminating keys of a control unit. The method includes illuminating the keys of a keypad through a light guide and selectively restricting or transmitting light from the light guide to one or more keys through individually actuable grid sections of a light shutter disposed between the light guide and the keys.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and that, unless otherwise indicated, they are merely intended to conceptually illustrate the structures and procedures described herein. In addition, any suitable size, shape or type of elements or materials could be used.

DETAILED DESCRIPTION OF THE EXEMPLARY EMBODIMENTS OF THE INVENTION

Figure 1:
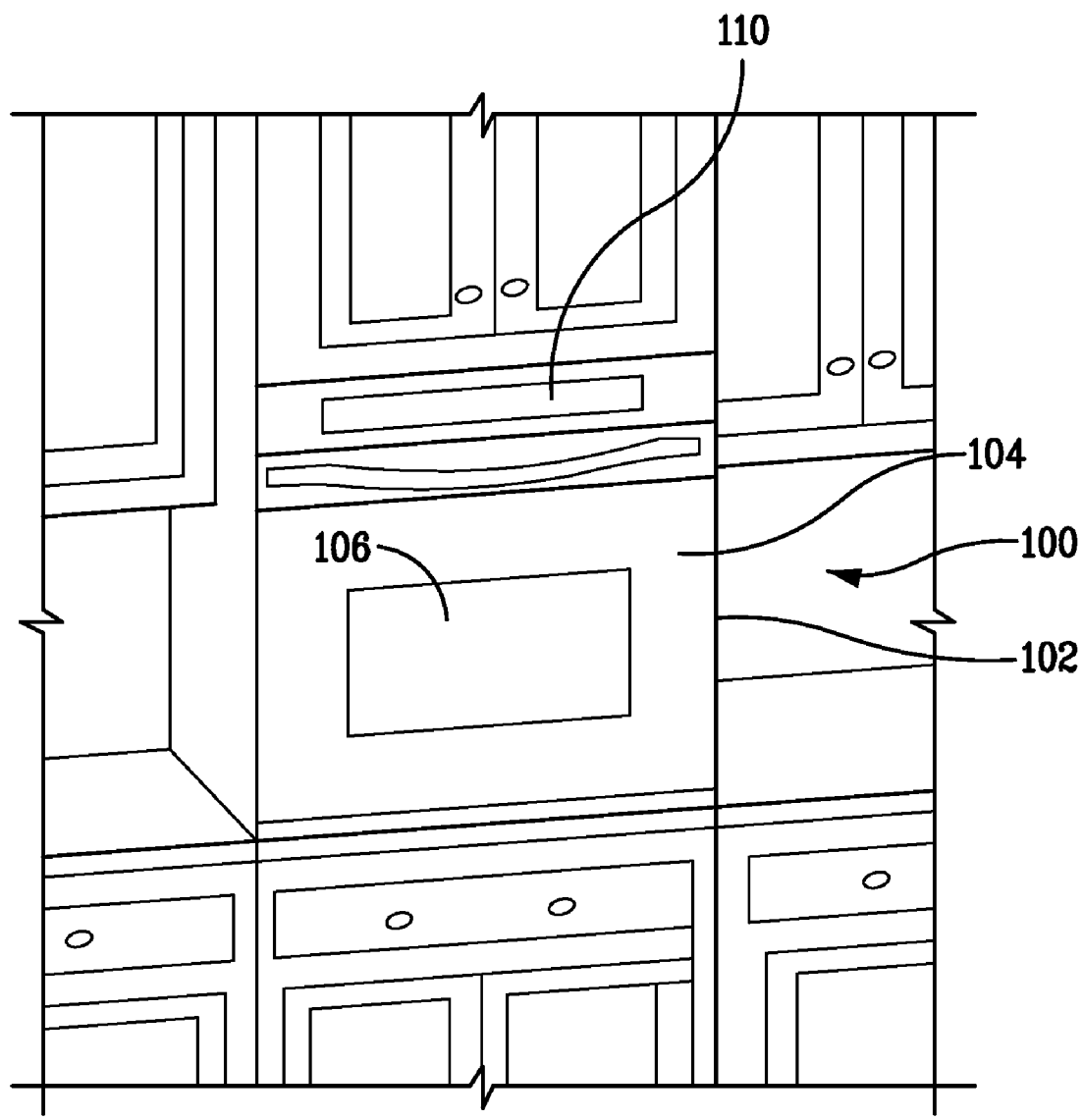
FIG. 1 is an illustration of a cooking appliance in accordance with an exemplary embodiment.
Figure 2:
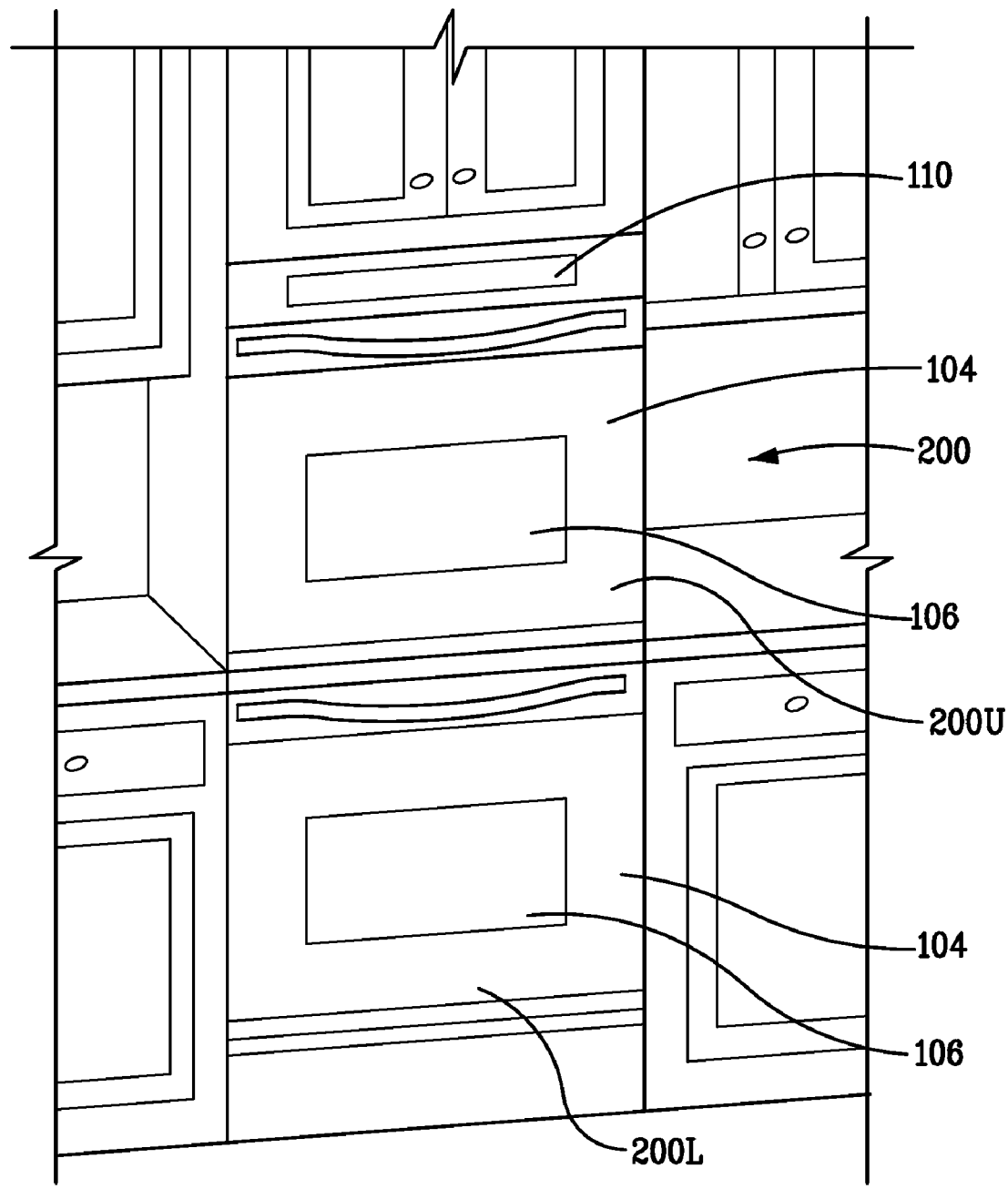
FIG. 2 is an illustration of another cooking appliance in accordance with an exemplary embodiment.

FIG. 1 illustrates a front perspective view of a wall oven 100 in accordance with an exemplary embodiment. While the exemplary embodiment will be described with respect to a cooking appliance, it should be understood that the exemplary embodiments can be applied to any suitable type of appliance or other electronic device having a control panel with selectable control features, including but not limited to, clothes washers and dryers, refrigerators and air conditioners.

In this example, the oven 100 includes a cabinet 102 defining a cooking cavity. The cooking cavity includes a hinged door 104 having a window 106 for viewing contents within the cooking cavity during cooking.

The operational components of the oven 100 are selectively operable through manipulation of a control panel 110 including a plurality of backlit user actuable touch pads or keys which are selectively illuminated under the control of a control unit which may provide heuristic or prompting illumination of the keys to guide the user in the operating mode selection process. The control unit may be configured to act as a lighted range control that illuminates one or more selectable keys on the control panel 110 depending on key selections made through the control panel 110. For example, with the oven 100 in an idle state a user may touch or otherwise activate the control panel 110 so that all of the keys are illuminated. As the user selects functions of the oven 100, only the keys relevant to the previously selected functions will be backlit while the other keys will be blacked out (e.g., backlighting is restricted so the keys are not illuminated). The restriction of the backlighting may be performed with a light shutter disposed between a light source and a keypad.

Figure 3:
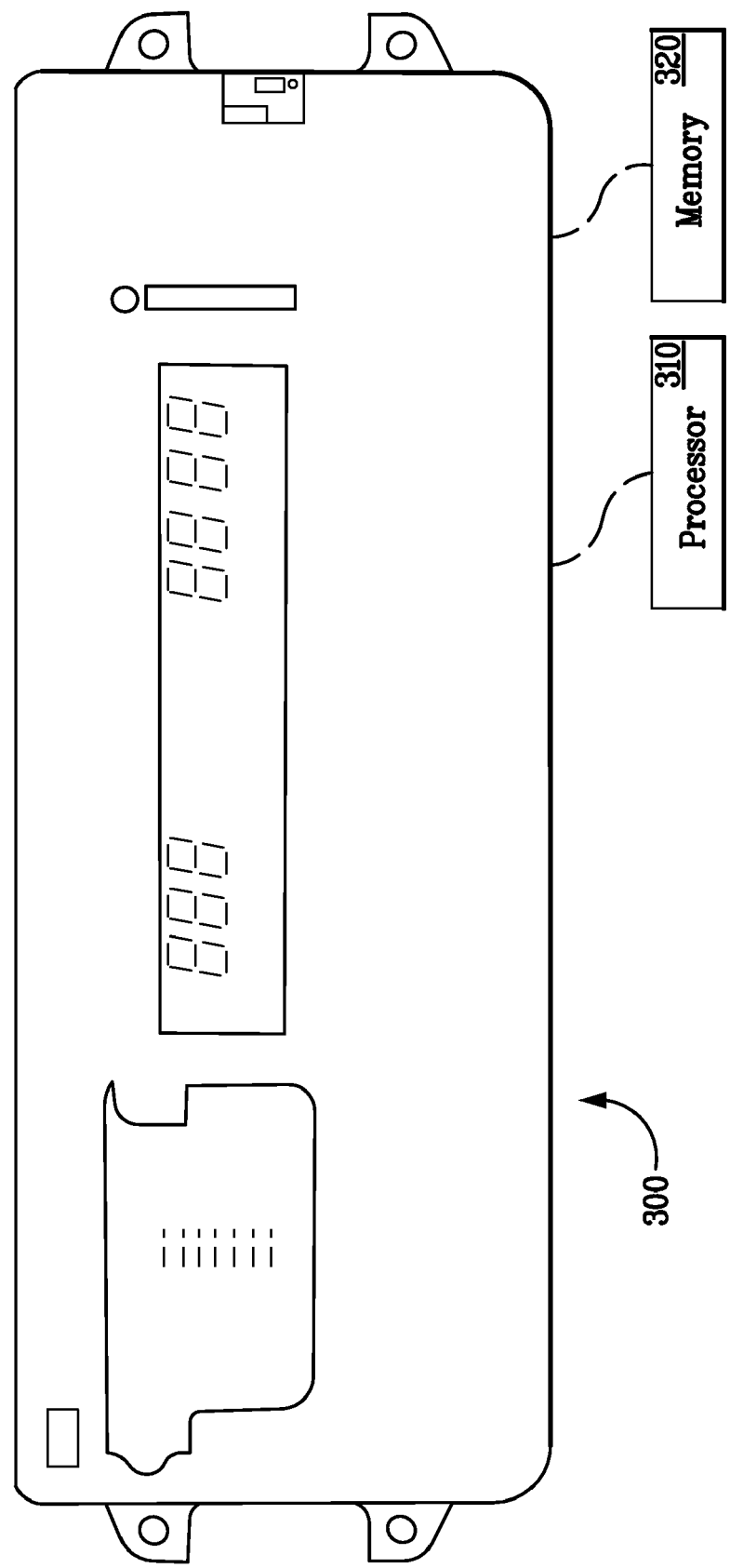
FIG. 3 is a schematic illustration of a control unit in accordance with an exemplary embodiment.
Figure 4:
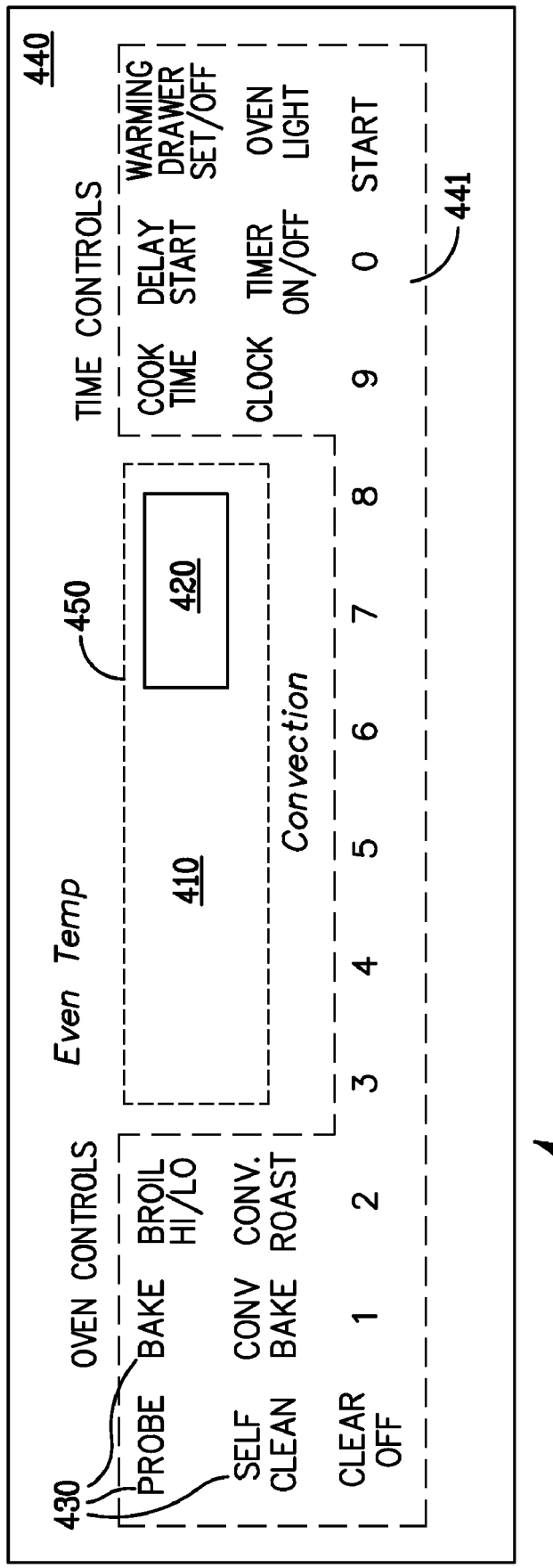
FIG. 4 is an schematic illustration of a control panel of the control unit of FIG. 3 in accordance with an exemplary embodiment.

Referring to FIG. 3, an exemplary control unit 300 for the oven 100 is shown. The control unit 300 includes a processor 310 and a memory 320. The memory 320 includes suitable control algorithms that are executed by the processor 310 to cause operation of the control unit 300 as described herein. Referring also to FIG. 4, an exemplary control panel 400 of the control unit 300 is shown. In this exemplary embodiment, the control panel 400 may include a keypad 441 having a keypad surface 440 comprising an array of user actuable touch areas or keys 430, a light blocking device 502 (see FIG. 5) and a light producing device 601 (see FIG. 6).

The keypad surface 440 may be a smooth surface made of, for example, glass and having capacitive touch capabilities. In alternate embodiments the keypad 441 may be constructed of any suitable material such as, for example, plastic, and include moveable buttons and/or knobs alone or in combination with a touch capable screen. The keypad surface 440 may include a window 450 or portion that is substantially clear to allow viewing of, for example, a display 410 included in the control panel 400. The display 410 may be any suitable display such as, for example, a liquid crystal display (LCD) configured to visually present any suitable information pertaining to the operation of the oven 100 of FIG. 1. For example, the display may include, but is not limited to, an oven temperature readout, a clock 420, convection fan status and oven mode status.

As can be seen in FIG. 4, the keypad 441 includes oven control touch area indicatorsor keys 430. As shown in FIG. 4, the oven control indicators or keys 430 may include any suitable indicia corresponding to the functions of the oven 100 of FIG. 1 such as, for example, bake, broil, convection, cleaning, timer, clock and light functions of the oven or simply numbers. The keypad 441 may be configured to allow light to pass through the surface at the oven control keys 430 while the remainder of the keypad surface 440 may be tinted or colored in any suitable manner so that the keypad surface 440 is substantially non-translucent. For example, referring to the BAKE indicator, the characters (or symbols) of the word "BAKE" may be configured so that light is transmitted through each individual character so that when the key associated with the word BAKE is backlit, as will be described in greater detail below, it is easily legible against the substantially non-translucent keypad surface 440. It should be understood that while only the BAKE indicator is described, all of the oven control indicators 430 are configured to be translucent or transparent (or otherwise able to transmit light) so that when they are illuminated or backlit they are easily legible.

Figure 5:
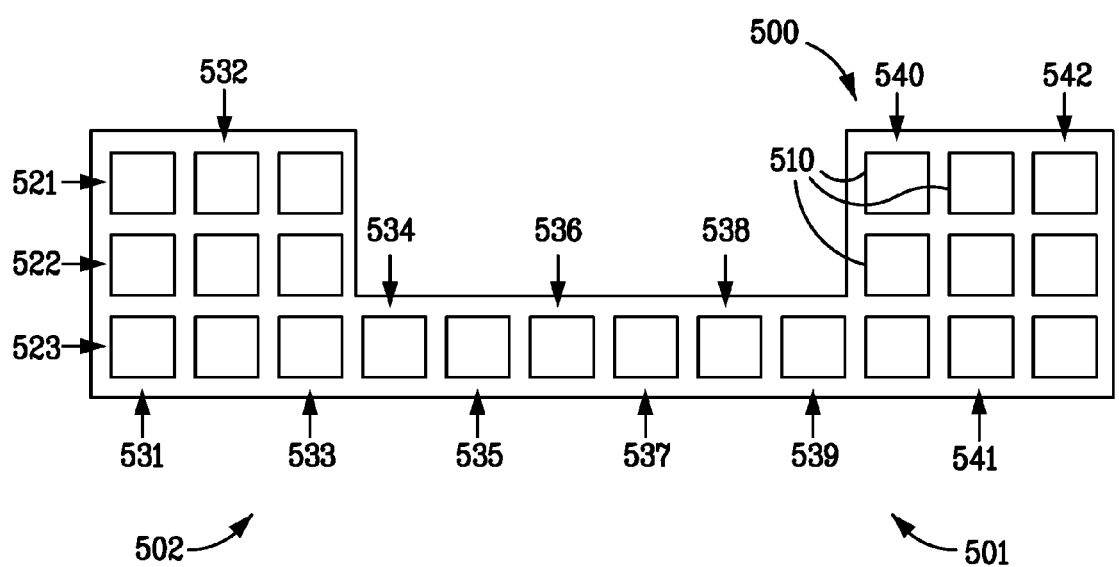
FIG. 5 is a schematic illustration of a light blocking device of the control unit of FIG. 3 in accordance with an exemplary embodiment.

Referring to FIG. 5, the light blocking device 502 may be any suitable shutter system capable of, for example, individually blocking the backlighting of a respective oven control indicator 430 of FIG. 4. The shutter system of the light blocking device 502 may include, but is not limited to, electrostatic shutter systems, iris type shutter systems, magnetite shutter systems or any other light shutter system or combination of light shutter systems operating under mechanical, chemical, electrical and/or magnetic principles. In this exemplary embodiment, the light blocking device 502 is a LCD grid 500. The LCD grid 500 includes a LCD panel 501 having individually actuable grid sections 510. The grid sections may be actuable between a light restricting mode and a light transmitting mode as will be described below. In this exemplary embodiment the grid sections 510 are arranged in rows 521-523 and columns 531-542 so that each of the individually actuable grid sections 510 corresponds with a respective one of the oven control indicators 430 as can be readily seen from a comparison between FIGS. 4 and 5. In alternate embodiments, the grid sections, as well as the oven control indicators 430, may have any suitable spatial arrangement including, but not limited to, arcuate or any other geometrical patterns such that the grid sections 510 are able to either restrict or transmit light to the oven control indicators 430. In this exemplary embodiment, the LCD grid 500 is arranged so that when a grid section 510 is actuated a respective oven control indicator 430 of FIG. 4 is substantially blacked out or is not illuminated. It should be understood that while the term "blacked out" is used to describe a blocking of the backlighting, the LCD grid 500 may be configured to block the backlight using any suitable color so that when the oven control indicator is not illuminated that oven control indicator appears to blend in with the keypad surface 440 of FIG. 4. For example, if the keypad surface 440 has a red color (or any other suitable color) the grid sections 510 may be configured to be red in color when actuated so that the "blacked out" oven control indicator matches the color of the keypad surface 440.

Figure 6:
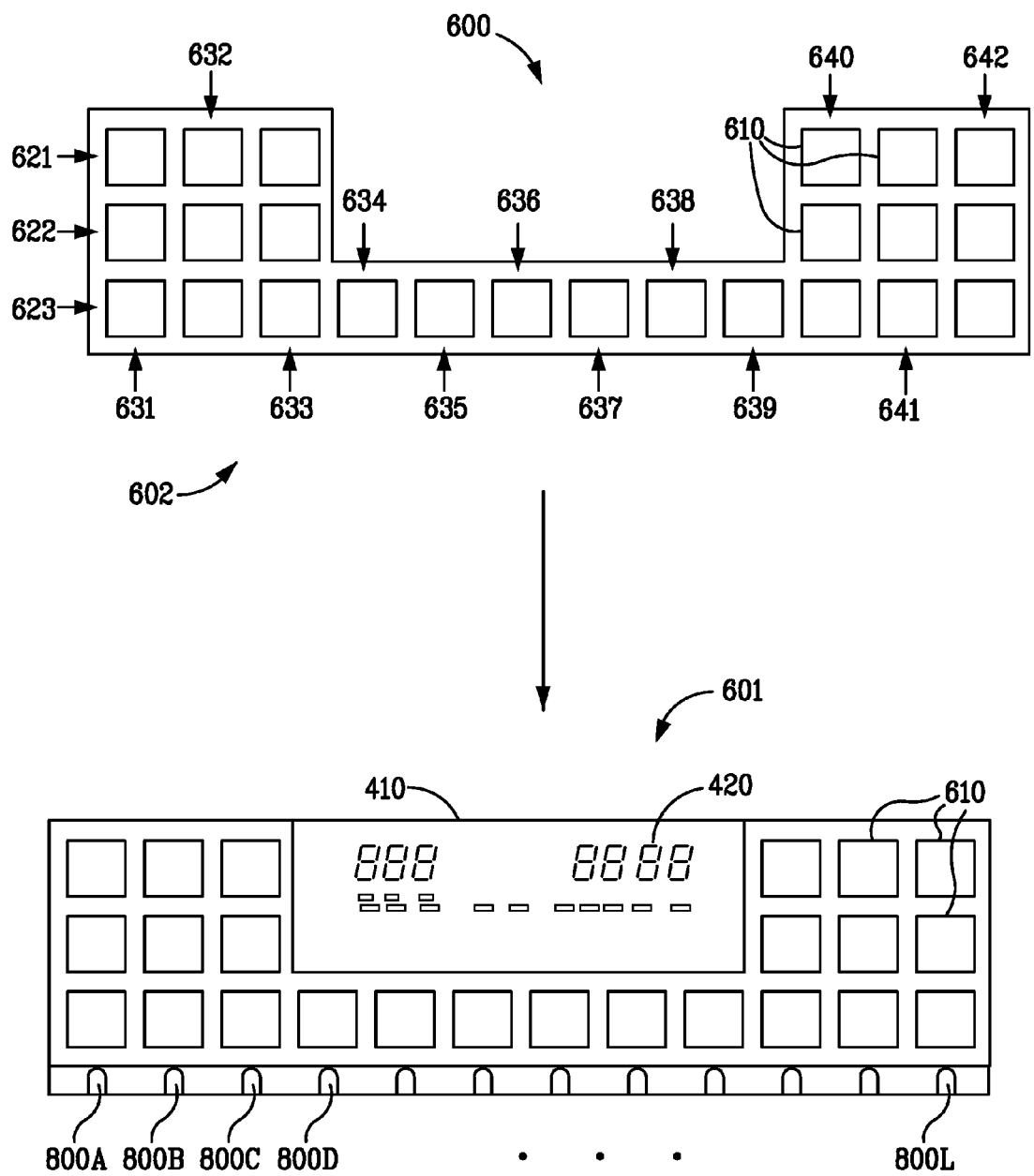
FIG. 6 is a schematic illustration of a light producing device of the control unit of FIG. 3 in accordance with an exemplary embodiment.
Figure 8:
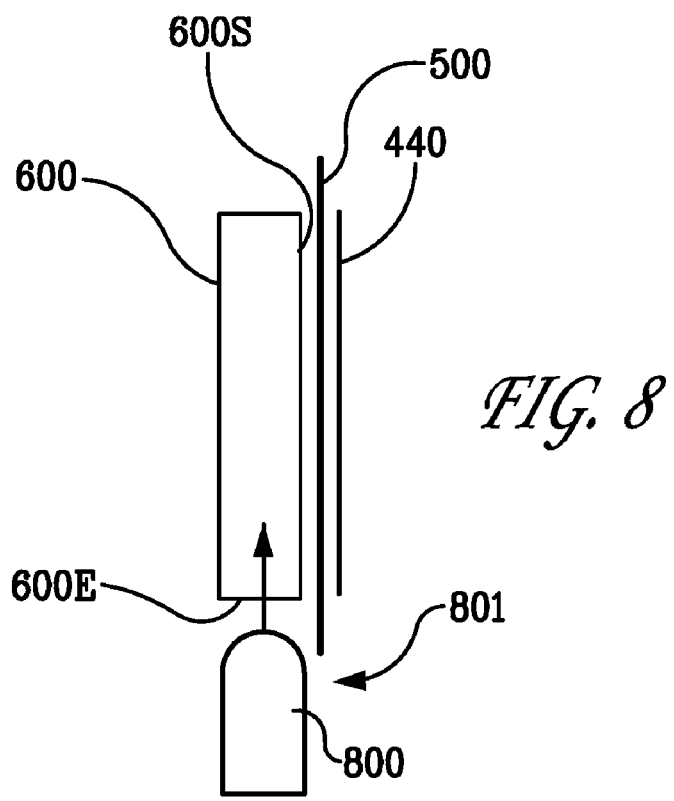
FIG. 8 is a schematic cross sectional view of a portion of the light producing device of FIG. 6.

Referring to FIGS. 6 and 8, the light producing device 601 may be any suitable light producing device such as, for example, a light guide 600 and a light source 801. The light guide 600 may have any suitable shape, size and/or configuration and be constructed of any suitable material for transmitting light to all key locations of the keypad 441 of FIG. 4. In this example the light guide 600 is shaped in a manner substantially similar to the LCD grid 500. The light guide 600 in this exemplary embodiment may be configured so that a surface 600S as shown in FIG. 8 of the light guide 600 includes backlight sections 610 that form, for example, a grid having rows 621-623 and columns 631-642 substantially similar to the rows 521-523 and the columns 531-542 described above in connection with FIG. 5. In alternate embodiments, the light guide may not include a grid such that an entire surface such as surface 600S is illuminated. The backlight sections 610 correspond with the oven control indicators 430 of FIG. 4 and are configured to direct light from the light source 801 to respective oven control indicators 430. For example, when the light source 801 is illuminated, a backlight section 610 directs the light from the light source toward a respective oven control indicator 430.

Figure 7:
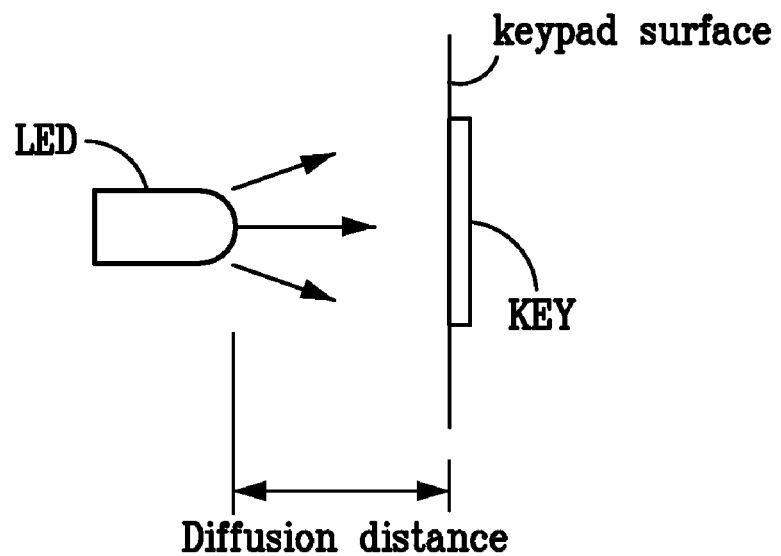
FIG. 7 is a portion of a prior art lighted keypad.

The light source 801 may be any suitable light source including, but not limited to, LED, incandescent, fluorescent, halogen and quartz sources. In this exemplary embodiment, and for exemplary purposes only, the light source will be described as an LED 800. The LED 800 may be configured to introduce light into the light guide 600 in any suitable manner such as through an edge 600E of the light guide that is substantially perpendicular to the surface 600S. In this manner, the light source does not have to be located behind and spaced apart from the keypad to ensure sufficient lighting of a corresponding oven control indicator 430 (see FIG. 4) making for a more compact and simplified keypad when compared to the light source of FIG. 7. As can be seen in FIG. 6, there may be any suitable number of LEDs 800A-800L for lighting the keys corresponding to the oven control indictors 430 of the keypad 441. For example, in one exemplary embodiment there may be an LED 800A-800L corresponding to each column 631-642 of the light guide 600. In alternate embodiments the LEDs 800 may correspond to the rows 621-623 (or both the rows and columns) of the light guide 600. In still other alternate embodiments there may be only one light source that illuminates the entire light guide 600. In this exemplary embodiment, the LEDs 800 may be configured to remain illuminated (e.g., constantly illuminated) while the keypad 441 of FIG. 4 is in use, eliminating a switching mechanism and thereby contributing to the compact size and simplified design of the keypad.

As can be seen best in FIG. 8 the control panel 400 of FIG. 4 is constructed so that the LCD grid 500 is located between the light guide 600 and the keypad surface 440 of FIG. 4. As described above, each LCD grid section 510 of FIG. 5 corresponds to a respective oven control indicator 430 (e.g., key) (see FIG. 4) on the keypad surface 440 as well as to a respective backlight section 610 (see FIG. 6). In operation, when the LCD grid sections 510 are not actuated, light from the light guide 600 is transmitted from the light guide 600 through the LCD grid 500 to the keypad surface for illuminating the oven control indicators 430 against the keypad surface 440. When a LCD grid section 510 is actuated, light from the light guide 600 is restricted and substantially prevented from passing through the actuated LCD grid section 510 so that the respective oven control indicator 430 is not illuminated.

Figure 9A:
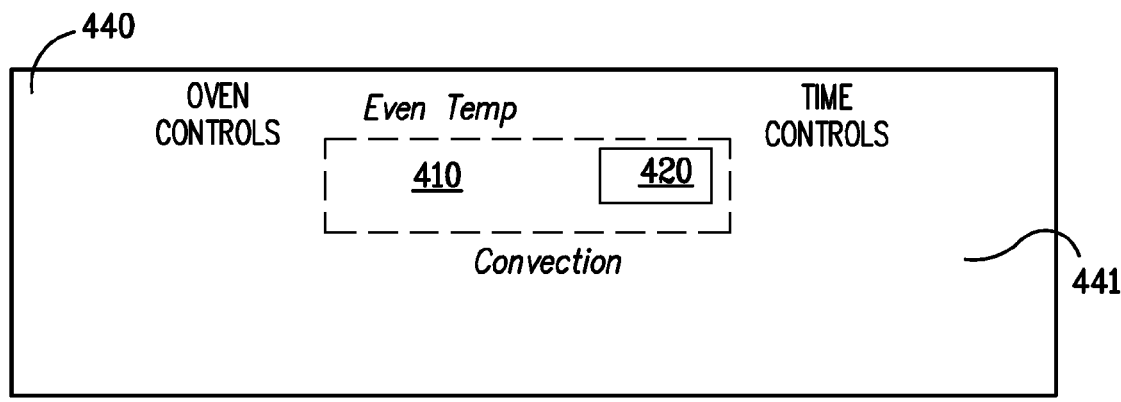
FIGS. 9A-9D illustrate an operation of a keypad in accordance with an exemplary embodiment.
Figure 9B:
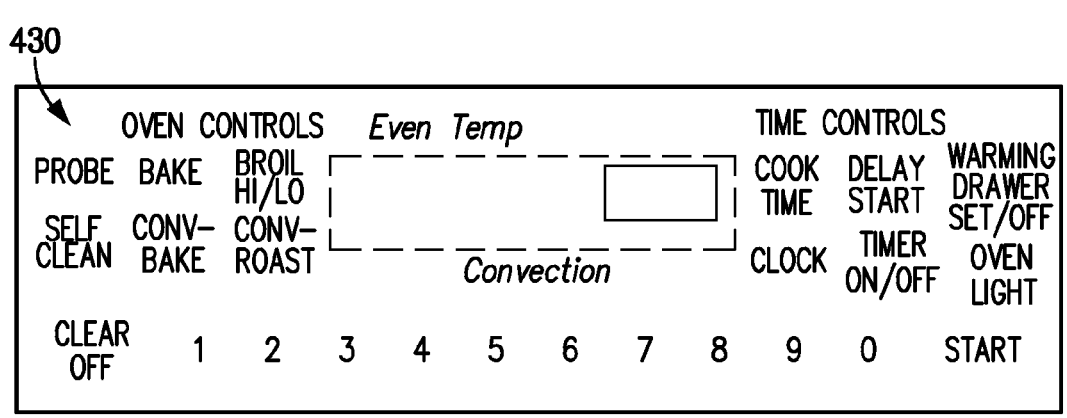
Figure 9C:
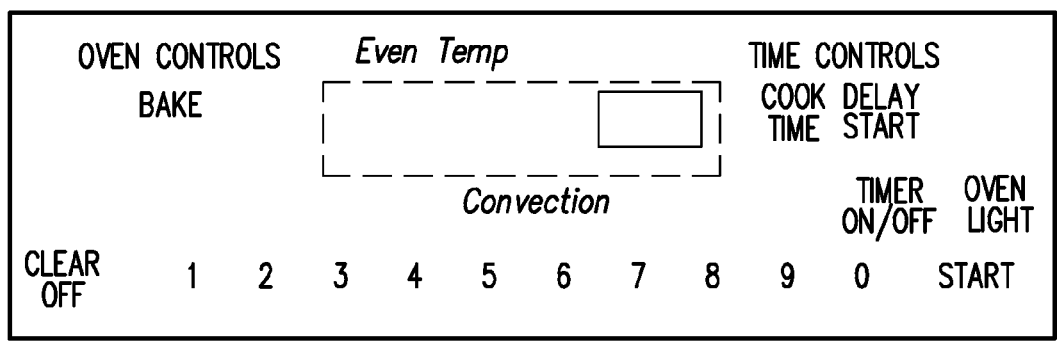

Referring to FIGS. 9A-9C, in accordance with the exemplary embodiments, a heuristic or prompting keypad system can be created by restricting or allowing the transmission of light from the light guide 600 of FIG. 6 to the keypad surface 440. In this exemplary embodiment the processor 310 of the control unit 300 (see FIG. 3) may be configured to cause the LCD grid 500 of FIG. 5 to selectively restrict or allow the passage of light depending on selections made through the keypad 441. For example, in one exemplary embodiment, as can be seen in FIG. 9A, when the keypad 441 is not being used or is in an idle state the oven control indicators 430 are not illuminated. It should be understood that when the oven control indicators 430 are not illuminated, either in the idle state or otherwise, the oven control indicators 430 may not be visible on the keypad surface 440 (e.g., blend in with the keypad surface) or they may be visible against the keypad surface 440 but not illuminated. In one example, while the keypad is in the idle state, the light source such as the LEDs may be turned off while in other examples, the LCD grid sections 510 may be activated to restrict the light from light guide so that the oven control indicators 430 are not illuminated. As described above, the keypad 441 may include touch sensitive capabilities so that when the keypad 441 is touched the keypad is turned on or otherwise placed in an active state.

As can be seen in FIG. 9B, in this exemplary embodiment, when the keypad 441 is placed in an active state all of the oven control indicators 430 are illuminated and are selectable by a user. In alternate embodiments, less than all of the oven control indicators may be illuminated such as where an oven control indicator is not selectable unless another indicator is previously selected such as with, for example, an hierarchical order of oven functions. One non-limiting example of the hierarchical order of oven functions, which is provided for illustrative purposes only, may include timing functions of the oven not being illuminated until a cooking function is selected. In this exemplary embodiment, as one of the oven control indicators 430 is selected, other oven control indicators 430 are blacked out so that only certain oven control indicators 430 related to the selected oven control indicator are illuminated. For example, referring to FIG. 9C, in this example the BAKE oven control indicator is selected. Based on the selection of the BAKE oven control indicator the processor 310 of FIG. 3 may be configured to cause the LCD grids corresponding to the PROBE, SELF CLEAN, CONV. BAKE, CONV. ROAST, BROIL HI/LO, CLOCK and WARMING DRAWER SET/OFF control indicators to become active so that light from respective portions of the light guide 600 of FIG. 6 is restricted and the aforementioned oven control indicators are not illuminated. As can be seen in FIG. 9C, as a non-limiting example, only the oven control indicators related to the BAKE feature (e.g., COOK TIME, DELAY START, TIMER ON/OFF, OVEN LIGHT, START, CLEAR OFF, and numbers 1-0) are illuminated and available for selection.

Figure 9D:
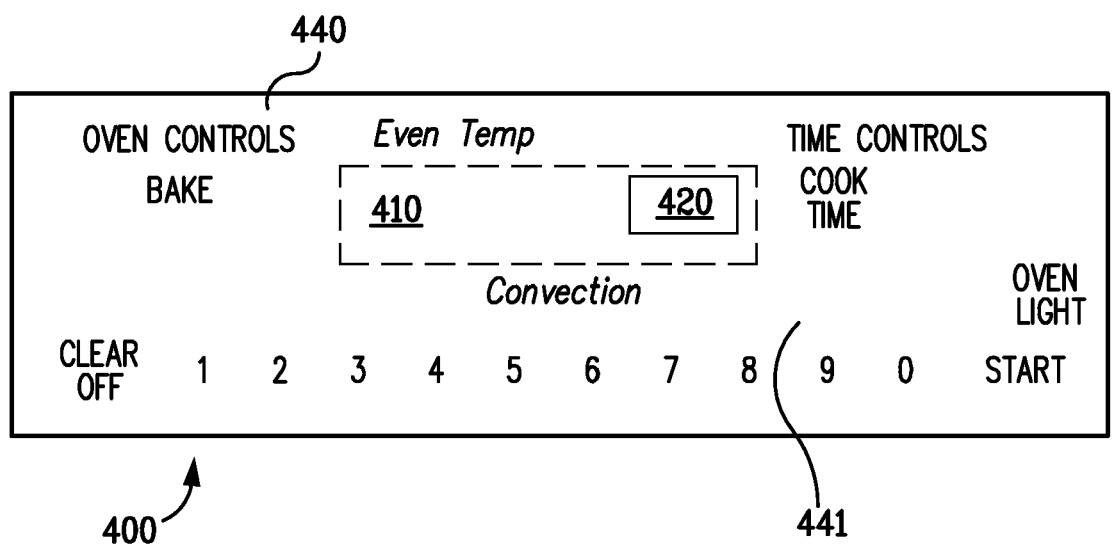

As can be seen in FIG. 9D, the selections may be reduced even further. For example, if the COOK TIME oven control indicator is selected the oven control indicators DELAY START and TIMER ON/OFF may be blacked out as they may not be related to the COOK TIME oven control indicator.

As another example, if the DELAY START oven control indicator is selected from FIG. 9B, the oven control indicators BAKE, BROIL HI/LO, CONV. BAKE, CONV. ROAST and numbers 1-0 may remain illuminated while the other oven control indicators are blacked out through activation of corresponding LCD grid sections 510 of FIG. 5.

To remind a user of an order in which the oven control indicators 430 have been selected in a sequence of selections, previously selected oven control indicators 430 may change color. For example, the LCD grid section 510 of FIG. 5 may be configured to alter the light transmitted from the light guide 600 of FIG. 6 or produce their own light for changing the color of the selected oven control indicators. For example, referring back to FIGS. 9B and 9C, when the keypad 441 is activated the oven control indicators may be illuminated in a first color. When, for example, the BAKE oven control indicator is selected, the LCD grid section 510 corresponding to the BAKE oven control indicator may cause the word BAKE to be presented in a second color while the COOK TIME, DELAY START, TIMER ON/OFF, OVEN LIGHT, CLEAR OFF, START and numbers 1-0 remain illuminated with the first color.

It should be understood that any suitable relationships may be established between the oven control indicators 430 so that any suitable combination of oven control indicators 430 may be illuminated during operation of the prompting keypad. The examples given above are merely for exemplary purposes only and should not be considered as limiting the operation of the prompting keypad.

The exemplary embodiments allow for a simplified control panel or keypad system that prompts a user of the available control functions of a device. The compact keypad and individually actuable light shutters for the individual control indicators provides for an energy efficient, inexpensive and simplified design that is more economical to incorporate into both high end and low end products.

Thus, while there have been shown and described and pointed out fundamental novel features of the invention as applied to the exemplary embodiments thereof, it will be understood that various omissions and substitutions and changes in the form and details of devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A control unit comprising:
   a keypad comprising a plurality of control indicators;
   a light producing device configured to illuminate the control indicators;
   a light blocking device disposed between the control indicators and the light producing device and configured to selectively restrict or transmit light from the light producing device to the control indicators; and
   wherein the control unit is configured to:
      enable the light blocking device to illuminate all active control indicators in a first color;
      detect a selection of an active control indicator; and
      enable the light blocking device to illuminate the selected control indicator in a second color different than the first color.

2. The control unit of claim 1, wherein the light blocking device comprises a liquid crystal display grid.

3. The control unit of claim 2, wherein the display grid comprises a plurality of grid sections, each grid section of the display grid corresponding to a respective one of the control indicators.

4. The control unit of claim 1, wherein the light producing device comprises a light guide and a light source, where the light source is configured to direct light into the light guide for illuminating the control indicators.

5. The control unit of claim 4, wherein the light source comprises one or more light emitting diodes.

6. The control unit of claim 1, wherein the control unit comprises a prompting keypad system.

7. The control unit of claim 6, wherein the prompting keypad system comprises a processor configured to cause the light blocking device to restrict or transmit light to one or more control indicators depending on a previously selected control indicator related to the one or more control indicators.

8. A control unit for an appliance, comprising:
   a keypad comprising control indicators forming keys of the keypad;
   a light guide disposed adjacent the keys and configured to direct light from a light source to the keys for illuminating the keys; and
   a liquid crystal display grid disposed between the keypad and the light guide, the liquid crystal display grid being configured to selectively restrict light from being transmitted from the light guide to one or more keys;
   wherein the control unit is configured to:
     enable the liquid crystal display arid to illuminate all active keys in a first color;
     detect a selection of an active key: and
     enable the liquid crystal display grid to illuminate the selected key in a second color different than the first color.

9. The control unit of claim 8, wherein the liquid crystal display grid comprises independently actuable grid sections configured to restrict the light from being transmitted from the light guide to respective keys.

10. The control unit of claim 8, wherein the light source comprises at least one light emitting diode configured to continuously supply light to the light guide for illuminating the keys when the keypad is in an active state.

11. The control unit of claim 8, wherein the light source is disposed relative to the light guide such that light is transmitted into the light guide through an edge that is substantially perpendicular to a backlight section of the light guide.

12. The control unit of claim 8, further comprising a processor configured to cause the liquid crystal display grid to selectively restrict or transmit light to one or more keys depending on a previously selected key related to the one or more keys.

13. A method for illuminating keys of a control unit, comprising:
   illuminating keys of a keypad through a light guide;
   selectively restricting or transmitting light from the light guide to one or more keys through individually actuable grid sections of a light shutter disposed between the light guide and the keys;
   selectively controlling the individually actuable grid sections to selectively restrict or transmit light to the one or more keys depending on a previously selected key related to the one or more keys: and
   illuminating the previously selected key in a different color than the one or more keys.

14. The method of claim 13, further comprising supplying the light guide with light from at least one light emitting diode.

15. The method of claim 14, wherein the light is transmitted into the light guide through an edge that is substantially perpendicular to a backlight section of the light guide.

16. The method of claim 13, wherein the individually actuable grid sections are individually actuable grid sections of a liquid crystal display light shutter.

17. The method of claim 13, wherein when light is restricted to a respective key, a color of the non-illuminated key is substantially the same color as a surface of the keypad.

* * * * *